United States Patent
Singh et al.

(10) Patent No.: US 11,815,880 B2
(45) Date of Patent: *Nov. 14, 2023

(54) HUMAN-IN-THE-LOOP ROBOT TRAINING FOR ROBOTIC PROCESS AUTOMATION

(71) Applicant: UiPath, Inc., New York, NY (US)

(72) Inventors: Prabhdeep Singh, Bellevue, WA (US); Liji Kunnath, Bangalore (IN); Palak Kadakia, Redmond, WA (US)

(73) Assignee: UiPath, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/506,292

(22) Filed: Oct. 20, 2021

(65) Prior Publication Data
US 2022/0035343 A1 Feb. 3, 2022

Related U.S. Application Data

(63) Continuation of application No. 16/708,036, filed on Dec. 9, 2019.

(60) Provisional application No. 62/915,429, filed on Oct. 15, 2019.

(51) Int. Cl.
*G05B 19/4155* (2006.01)
*G06F 8/60* (2018.01)
*B25J 9/16* (2006.01)
*G06N 20/00* (2019.01)

(52) U.S. Cl.
CPC .......... *G05B 19/4155* (2013.01); *B25J 9/163* (2013.01); *G06F 8/60* (2013.01); *G06N 20/00* (2019.01); *G05B 2219/39371* (2013.01)

(58) Field of Classification Search
None
See application file for complete search history.

(56) References Cited

U.S. PATENT DOCUMENTS

| | | |
|---|---|---|
| 8,930,959 B2 | 1/2015 | Lahr |
| 9,555,544 B2 | 1/2017 | Bataller et al. |
| 10,324,457 B2 | 6/2019 | Neelakandan et al. |
| 10,339,027 B2 | 7/2019 | Garcia et al. |
| 10,365,799 B2 | 7/2019 | Hosbettu et al. |

(Continued)

FOREIGN PATENT DOCUMENTS

| | | | |
|---|---|---|---|
| CN | 104985599 B * | 7/2018 | ............ B25J 9/1602 |
| EP | 3133539 A1 | 2/2017 | |

(Continued)

OTHER PUBLICATIONS

Joseph "How to Scale RPA Beyond a Pilot", Verint Connect, Joseph, Jun. 29, 2019, https://connect.verint.com/b/customer-engagement/posts/how-to-scale-rpa-beyond-a-pilot (2019).

(Continued)

*Primary Examiner* — Charles E Anya
(74) *Attorney, Agent, or Firm* — LeonardPatel PC; Michael A. Leonard II; Sheetal S. Patel

(57) ABSTRACT

Human-in-the-loop robot training using artificial intelligence (AI) for robotic process automation (RPA) is disclosed. This may be accomplished by a listener robot watching interactions of a user or another robot with a computing system. Based on the interactions by the user or robot with the computing system, the robot may be improved and/or personalized for the user or a group of users.

18 Claims, 7 Drawing Sheets

(56) References Cited

U.S. PATENT DOCUMENTS

| | | | |
|---|---|---|---|
| 2006/0129367 | A1 | 6/2006 | Mishra et al. |
| 2015/0213065 | A1 | 7/2015 | Sisk et al. |
| 2015/0244730 | A1 | 8/2015 | Vu et al. |
| 2017/0052824 | A1 | 2/2017 | Sharma et al. |
| 2017/0060108 | A1 | 3/2017 | Kakhandiki et al. |
| 2017/0206064 | A1 | 7/2017 | Breazeal et al. |
| 2017/0228119 | A1 | 8/2017 | Hosbettu et al. |
| 2017/0372442 | A1 | 12/2017 | Mejias |
| 2018/0053117 | A1 | 2/2018 | Caffrey |
| 2018/0074931 | A1 | 3/2018 | Garcia et al. |
| 2018/0113781 | A1 | 4/2018 | Kim et al. |
| 2018/0197123 | A1 | 7/2018 | Parimelazhagan et al. |
| 2018/0284709 | A1* | 10/2018 | Dubey ............... G06Q 10/0633 |
| 2018/0329399 | A1 | 11/2018 | Neelakandan et al. |
| 2018/0341688 | A1 | 11/2018 | Ganesh et al. |
| 2018/0345489 | A1 | 12/2018 | Allen, IV et al. |
| 2018/0370029 | A1 | 12/2018 | Hall et al. |
| 2018/0370033 | A1 | 12/2018 | Geffen et al. |
| 2018/0373580 | A1 | 12/2018 | Ertl et al. |
| 2018/0374051 | A1 | 12/2018 | Li et al. |
| 2019/0116387 | A1 | 4/2019 | Anderson et al. |
| 2019/0124100 | A1 | 4/2019 | Shannon et al. |
| 2019/0126463 | A1 | 5/2019 | Purushothaman |
| 2019/0141125 | A1 | 5/2019 | Ogrinz et al. |
| 2019/0155225 | A1 | 5/2019 | Kothandaraman et al. |
| 2019/0180746 | A1 | 6/2019 | Diwan et al. |
| 2019/0244149 | A1 | 8/2019 | Krishnaswamy |
| 2019/0266254 | A1 | 8/2019 | Blumenfeld et al. |
| 2019/0286736 | A1 | 9/2019 | Sturtivant |
| 2019/0332508 | A1 | 10/2019 | Goyal et al. |
| 2019/0392949 | A1 | 12/2019 | Schermeier et al. |
| 2020/0065334 | A1 | 2/2020 | Rodriguez et al. |
| 2020/0287992 | A1 | 9/2020 | Berg et al. |
| 2021/0107164 | A1 | 4/2021 | Singh et al. |
| 2021/0109503 | A1 | 4/2021 | Singh et al. |
| 2021/0110256 | A1 | 4/2021 | Singh et al. |
| 2021/0110318 | A1 | 4/2021 | Singh et al. |

FOREIGN PATENT DOCUMENTS

| | | |
|---|---|---|
| IN | 201841032794 A | 9/2019 |
| JP | 2019049899 A | 3/2019 |
| WO | 2017223083 A1 | 12/2017 |
| WO | 2019195121 A1 | 10/2019 |

OTHER PUBLICATIONS

Scott M Ross, "Non-Final Office Action", dated Mar. 17, 2022, U.S. Appl. No. 16/707,763.

Celonis "What is Task Mining?" page available at https://www.celonis.com/process-mining/what-is-task-mining/#record-interactions (last accessed Dec. 6, 2019).

Di Bisceglie et al., "Data-driven Insights to Robotic Process Automation with Process Mining," Compact 2019 3 available at (last accessed Dec. 6, 2019).

International Search Report and Written Opinion of the International Search Authority issued by the Korean Intellectual Property Office (KIPO) dated Nov. 23, 2020.

International Search Report and Written Opinion of the International Search Authority issued by the Korean Intellectual Property Office (KIPO) dated Nov. 27, 2020.

International Search Report and Written Opinion of the International Search Authority issued by the Korean Intellectual Property Office (KIPO) dated Dec. 1, 2020.

International Search Report and Written Opinion of the International Search Authority issued for PCT Application No. PCT/US2020/046071 dated Dec. 14, 2020.

Ki-Bong Kim, "A Study of Convergence Technology in Robotic Process Automation for Task Automation," Journal of Convergence for Information Technology, vol. 9. No. 7, pp. 8-13, ISSN 2586-4440, DOI: https://doi.org/10.22156/ CS4SMB.2019.9.7.008 (Jul. 2019).

Angelica Ruiz, "Corrected Notice of Allowability", dated Aug. 17, 2022, U.S. Appl. No. 16/707,564.

Angelica Ruiz, "Notice of Allowance", dated Jun. 24, 2022, U.S. Appl. No. 16/707,564.

Charles E Anya, "Non-Final Office Action", dated Jun. 24, 2022, U.S. Appl. No. 16/708,036.

Jean Bruner Jeanglaude, "Non-Final Office Action", dated Jul. 12, 2022, U.S. Appl. No. 16/707,705.

Jean Bruner Jeanglaude, "Notice of Allowance", dated Sep. 13, 2022, U.S. Appl. No. 16/707,705.

Angelica Ruiz, "Non-Final Office Action", dated Sep. 16, 2022, U.S. Appl. No. 17/506,219.

Angelica Ruiz, "Notice of Allowance", dated Nov. 14, 2022, U.S. Appl. No. 17/506,219.

Charles E Anya, "Final Office Action", dated Sep. 19, 2022, U.S. Appl. No. 16/708,036.

Jean Bruner Jeanglaude, "Corrected Notice of Allowability", dated Sep. 21, 2022, U.S. Appl. No. 16/707,705.

Scott M Ross, "Final Office Action", dated Sep. 19, 2022, U.S. Appl. No. 16/707,763.

Angelica Ruiz, "Non-Final Office Action", dated Feb. 17, 2023, U.S. Appl. No. 17/823,185.

Angelica Ruiz, "Notice of Allowance", dated Mar. 31, 2023, U.S. Appl. No. 17/823,185.

Charles E Anya, "Examiner's Answer", dated Apr. 18, 2023, U.S. Appl. No. 16/708,036.

Extended European Search Report issued in EP Application No. 20875746.8 dated Aug. 18, 2023.

Extended European Search Report issued in EP Application No. 20877734.2 dated Aug. 28, 2023.

First Examination Report issued in Indian Application No. 202217022182 dated Jul. 5, 2023.

First Examination Report issued in Indian Application No. 202217022355 dated Jul. 3, 2023.

First Examination Report issued in Indian Application No. 202217022370 dated Jul. 3, 2023.

* cited by examiner

HUMAN-IN-THE-LOOP ROBOT TRAINING FOR ROBOTIC PROCESS AUTOMATION

CROSS-REFERENCE TO RELATED APPLICATIONS

This application is a continuation of, and claims the benefit of, U.S. patent application Ser. No. 16/708,036 filed Dec. 9, 2019, which claims the benefit, and priority to, U.S. Provisional Patent Application No. 62/915,429 filed Oct. 15, 2019. The subject matter of these earlier filed applications is hereby incorporated by reference in their entirety.

FIELD

The present invention generally relates to robotic process automation (RPA), and more specifically, to human-in-the-loop robot training for RPA.

BACKGROUND

RPA robots may be deployed to assist users with accomplishing various tasks. Such robots may be designed based on anticipated general functionality needs. However, the robots may not always be adapted to the needs of specific users. Accordingly, an improved approach for training and personalizing RPA robots may be beneficial.

SUMMARY

Certain embodiments of the present invention may provide solutions to the problems and needs in the art that have not yet been fully identified, appreciated, or solved by current robot training technologies. For example, some embodiments of the present invention pertain to human-in-the-loop robot training for RPA.

In an embodiment, a system includes a user computing system that includes an RPA robot and a listener. The system also includes a server. The listener is configured to monitor user interactions with the RPA robot via the user computing system and log data pertaining to the interactions. The listener is also configured to transmit the logged data pertaining to the user interactions to the server. The server is configured to receive the logged data pertaining to the user interactions and determine whether a modification should be made to an RPA workflow for the RPA robot based on the logged data. When the server determines that the modification should be made, when the modification is addressable by inserting an activity or sequence of activities into the RPA workflow for the RPA robot, the server is configured to insert the activity or sequence of activities into the RPA workflow for the RPA robot that makes the determined modification.

In another embodiment, a computer program is embodied on a non-transitory computer-readable medium. The program configured to cause at least one processor to monitor user interactions with an RPA robot via a user computing system and log data pertaining to the interactions. The logged data includes exceptions. The program is also configured to cause the at least one processor to transmit the logged data pertaining to the user interactions to a server, receive a new version of the RPA robot from the server that has been modified to address the exceptions in the logged data, and deploy the new version of the RPA robot.

In yet another embodiment, a computer-implemented method includes receiving, by a computing system, logged data pertaining to interactions of a user with an RPA robot and determining, by the computing system, whether a modification should be made to an RPA workflow for the RPA robot based on the logged data. When the computing system determines that the modification should be made, when the modification is addressable by inserting an activity or sequence of activities into the RPA workflow for the RPA robot, the computer-implemented method also includes inserting the activity or sequence of activities into the RPA workflow for the RPA robot that makes the determined modification, by the computing system.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

Unless otherwise indicated, similar reference characters denote corresponding features consistently throughout the attached drawings.

DETAILED DESCRIPTION OF THE EMBODIMENTS

Figure 1:
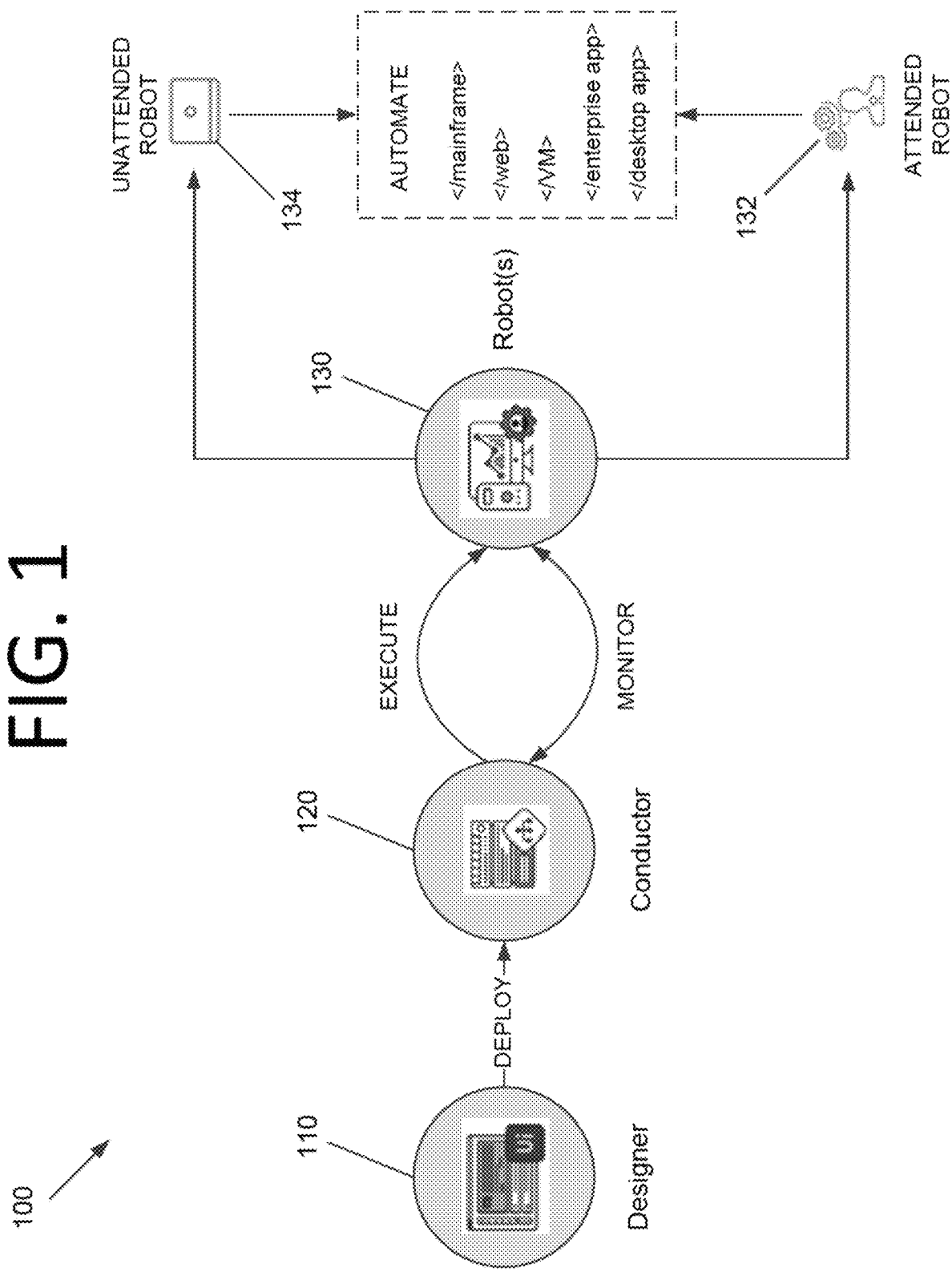
FIG. 1 is an architectural diagram illustrating an RPA system, according to an embodiment of the present invention.

Some embodiments of the present invention pertain to human-in-the-loop robot training for RPA. This may be accomplished in some embodiments by a listener robot watching interactions of a user with a computing system. The computing system may be a personal computer, a mobile device, a server (e.g., if the RPA robot assists with server operation and maintenance), or any other suitable computing system without deviating from the scope of the invention. For example, consider the case where one employee or a group of employees are achieving superior performance (e.g., converting an atypically high number of leads and generating significant sales). The listener robot(s) may send the log data to a server, where it may be stored in a database. In the case where the actions of one user are being analyzed, a workflow may be generated by analyzing and copying the user's actions, and a robot mimicking these actions may then be generated from the workflow and deployed to the computing systems of other users to enhance performance.

In the case that a group of users or robots are being monitored, the data from each user or robot may be sent to the server and analyzed using AI to recognize patterns of user behavioral processes therein and develop a machine learning (ML) model. An RPA workflow calling this ML model may then be generated and deployed.

In certain embodiments, the listener may watch the user's interactions with a robot, and based on the user's interactions with the robot, a new version of the robot that is more personalized for the user may be generated. If user-specific, the workflow for the robot may be modified to make changes specific to that user. For instance, if a user commands an attended robot to generate a certain email, but the user then goes in and manually adds certain closing text to the email, changes a font, etc., the system can learn that the user typically does this and create one or more activities in an RPA workflow that automatically make this change. A new, local version of the robot may be deployed without the user actively making any changes, and the user may then notice that the robot has started performing these actions automatically.

Some robots may perform an action based on a user's voice command or text input to achieve human-in-the-loop functionality. However, the initial, globally deployed version of the robot may not function well for all users. For instance, if the user commanding the robot has an accent, certain global ML models may not be able to properly recognize the user's speech. However, a local ML model can be trained to monitor and more effectively respond to that specific user's interactions with the robot, e.g., by learning to understand words spoken with the user's accent based on corrections to the text made by the user. The local model can thus be trained by learning from those interactions to personalize the robot for the user.

Generally, global ML models are trained using data from a wide pool of users. Consider the case of document processing. The global ML model may be trained on all enterprise documents or a portion thereof.

In some cases, however, a specific person or a group of people may be handling specific types of documents that are not effectively processed by the ML model. These documents may be in certain languages, have different data entities to be extracted, use different workflows, etc. In such cases, a local ML model may be trained to learn to handle these specific document types.

In some embodiments, exceptions may be gathered for retraining while the global ML model is being used. If the exceptions tend to be specific to a given user or group of users, the local ML model may be initially created and trained (or retrained) based on these exceptions. However, if the exceptions tend to be experienced by a large number of users, the global ML may be retrained as well based on these exceptions.

Consider the example of a focused inbox. There may be keywords that can be added for the purpose of detecting spam in a global ML model. However, for a certain company, emails having a keyword that is indicative of spam in the global ML context may not actually be spam for that company or for an individual. The listeners deployed on user computing systems may provide data indicating that emails placed into the spam folder for this reason were often moved to the inbox by one or more users. A local ML model could then be trained to not mark such emails as spam for that specific user or group of users.

In some embodiments, the local ML model learns the user's specific behaviors, such as user interactions with various applications, user steps taken during use of an application so those steps may be automated, etc. The local ML model may be applied first, and if no result is obtained, the global model may then be applied. In this manner, the global ML model may be used as a fallback if the local ML model fails to provide results.

In some embodiments, the robot may review analytics. For example, the robot may look at how many phone calls are made and the outcomes for a salesforce. The robot could search for the top employees, look at their patterns, and harvest this information for training. The robot could also look at keywords, analyze emotions (if video is taken and/or audio is captured, where certain facial expressions, speech patterns, and volumes may indicate emotions), etc. These analytics may help the robot to select the best application. For example, in the case of sales leads, if a user is taking leads from only one system and not another, the robot may choose to focus on the lead conversion software that works best.

Some embodiments may include an actuation aspect. In those embodiments, when effective expertise is quantified (e.g., using certain keywords), the robot may automatically take steps or make recommendations. Thus, the robot may learn to become an intelligent, guided tool for the user.

FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 are triggered by user events and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments and can automate many processes. Unattended robots 134 may be responsible for remote execution, monitoring, scheduling, and providing support for work queues. Debugging for all robot types may be run in designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™. In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
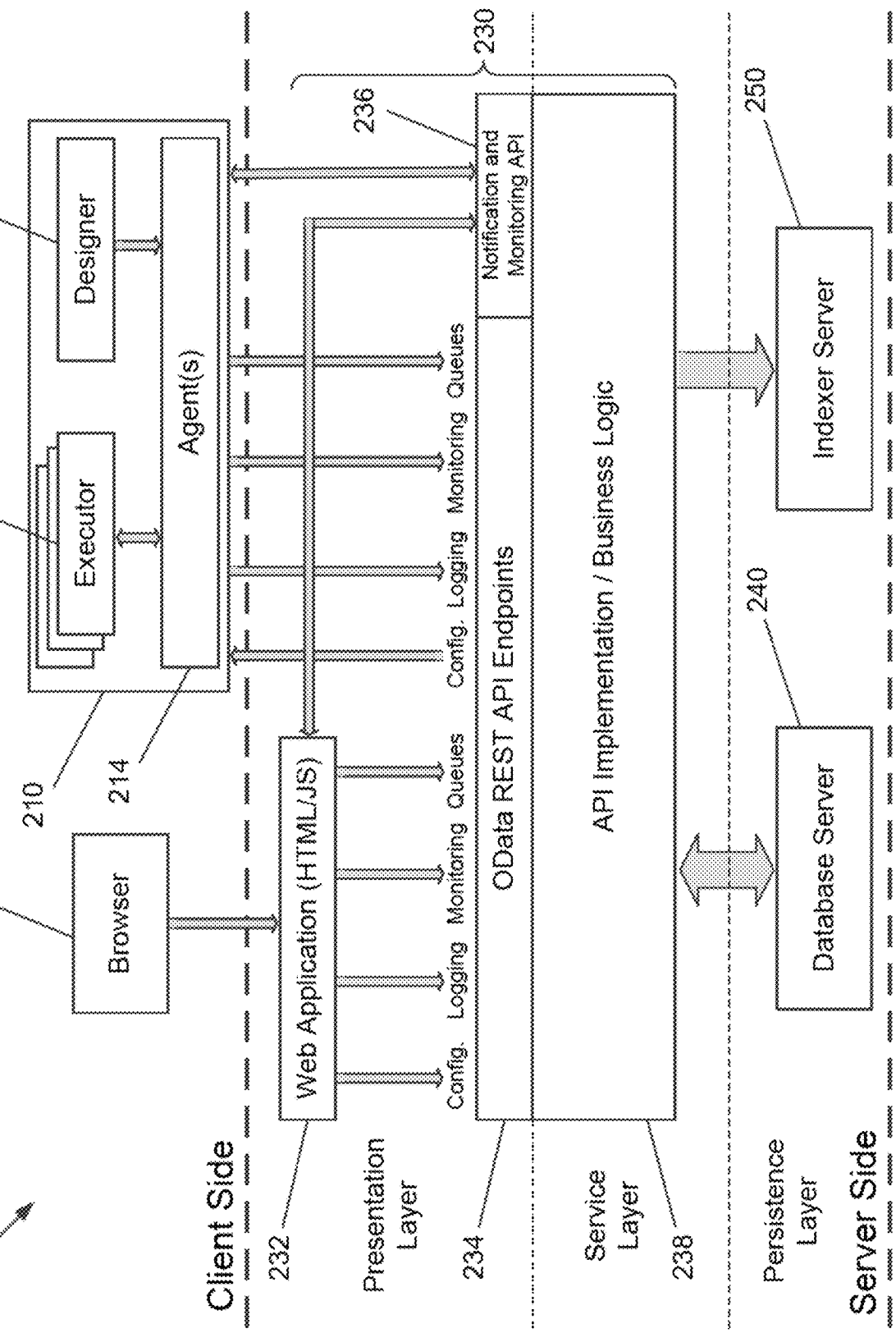
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a Web Socket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 220 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manages queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
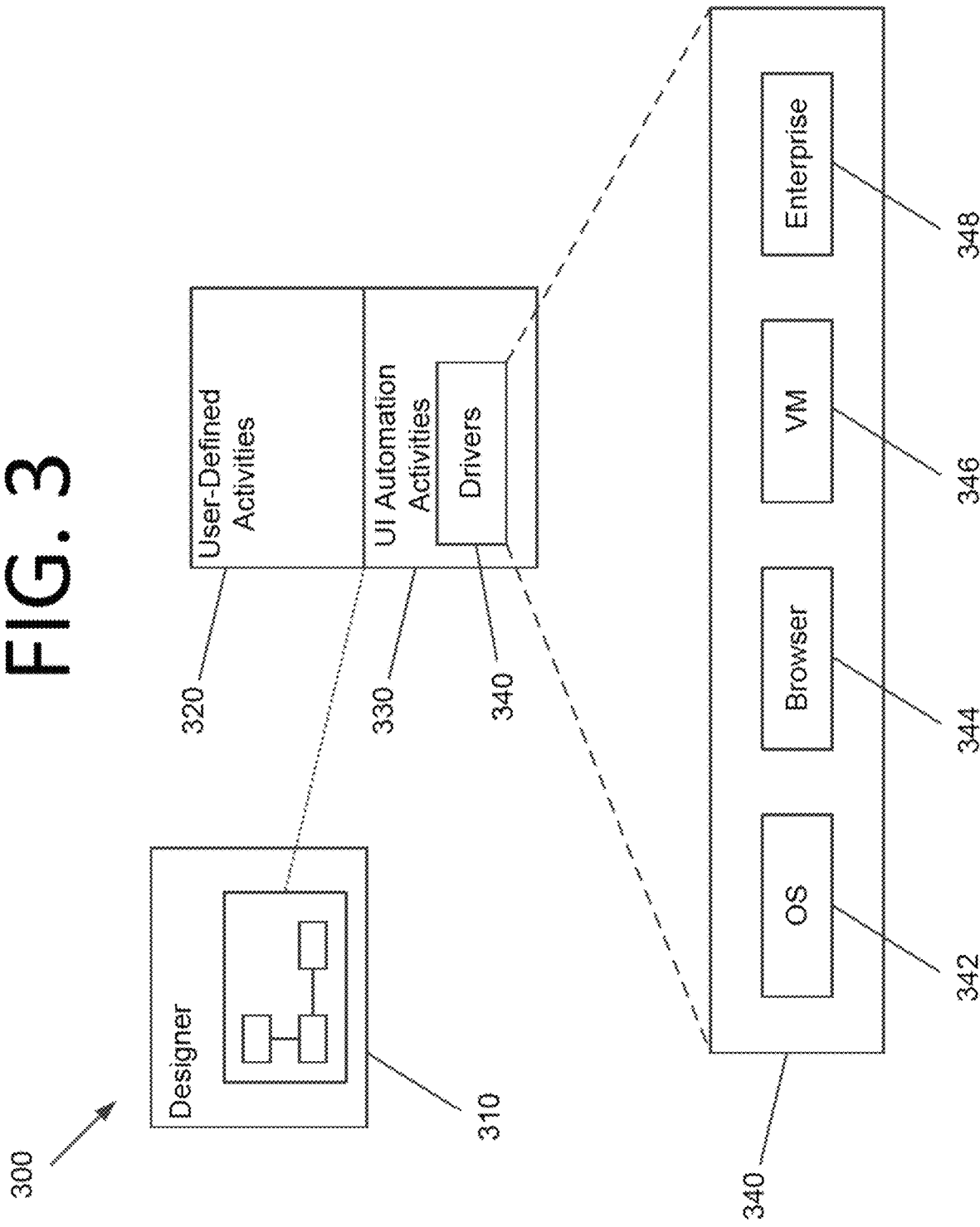
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, and drivers 340, according to an embodiment of the present invention. Per the above, a developer uses designer 310 to develop workflows that are executed by robots. Workflows may include user-defined activities 320 and UI automation activities 330. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with the screen. UI automation activities 330 facilitate these interactions via drivers 340 that allow the robot to interact with the desired software. For instance, drivers 340 may include OS drivers 342, browser drivers 344, VM drivers 346, enterprise application drivers 348, etc.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
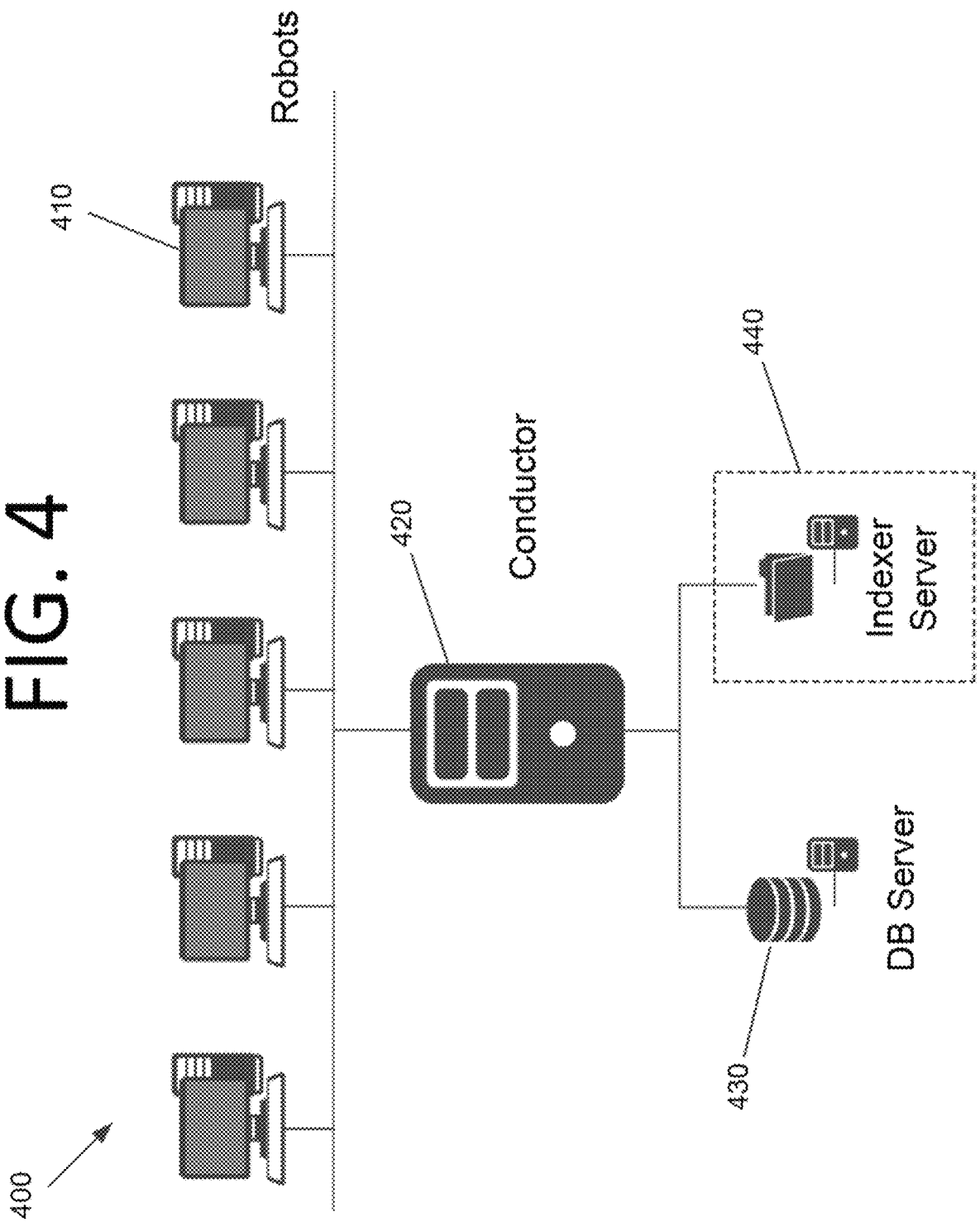
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client/server software may be used without deviating from the scope of the invention. For instance, the conductor may run a server-side application that communicates with non-web-based client software applications on the client computing systems.

Figure 5:
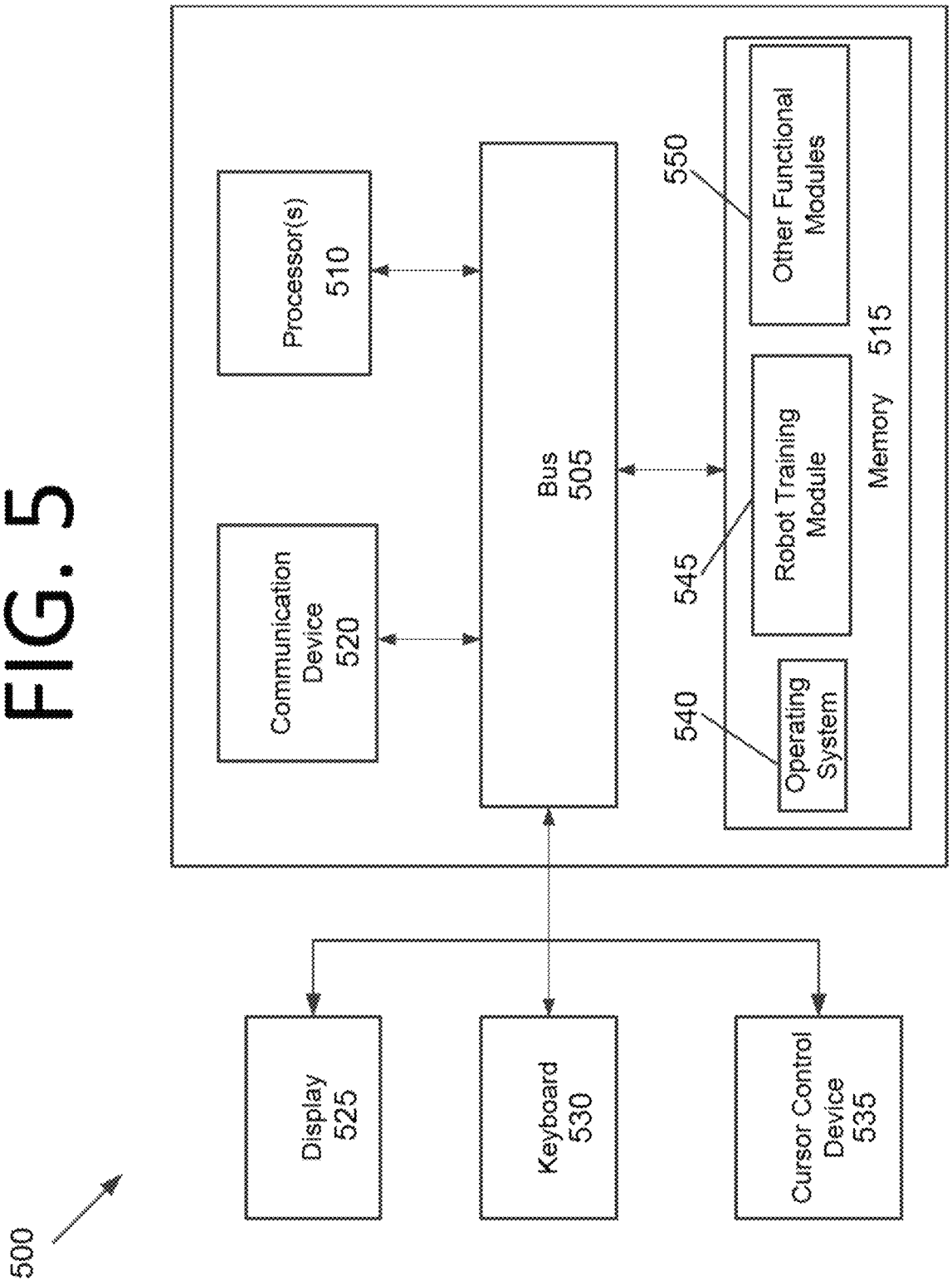
FIG. 5 is an architectural diagram illustrating a computing system configured to train a robot in an RPA environment, according to an embodiment of the present invention.

FIG. 5 is an architectural diagram illustrating a computing system 500 configured to perform human-in-the-loop robot training using AI for RPA, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beamsteering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include a robot training module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6:
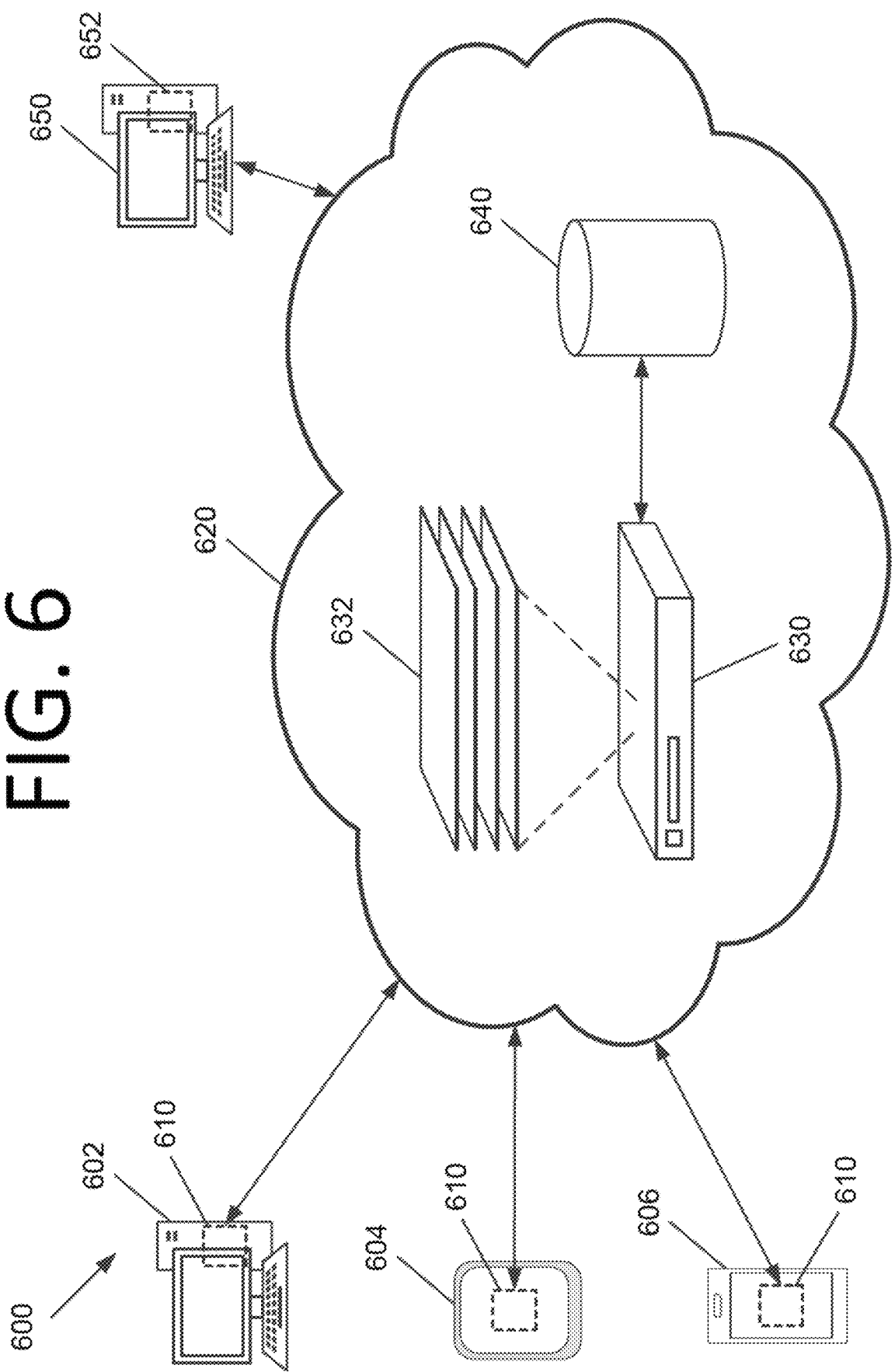
FIG. 6 is an architectural diagram illustrating a system configured to perform human-in-the-loop robot training using AI for RPA, according to an embodiment of the present invention.

FIG. 6 is an architectural diagram illustrating a system 600 configured to perform human-in-the-loop robot training using AI for RPA, according to an embodiment of the present invention. System 600 includes user computing systems, such as desktop computer 602, tablet 604, and smart phone 606. However, any desired computing system may be used without deviating from the scope of invention including, but not limited to, smart watches, laptop computers, Internet-of-Things (IoT) devices, vehicle computing systems, etc.

Each computing system 602, 604, 606 has a listener 610 installed thereon. Listeners 610 may be robots generated via an RPA designer application, part of an operating system, a downloadable application for a personal computer (PC) or smart phone, or any other software and/or hardware without deviating from the scope of the invention. Indeed, in some embodiments, the logic of one or more of listeners 610 is implemented partially or completely via physical hardware.

Listeners 610 generate logs of user interactions with robots on the respective computing system 602, 604, 606. Listeners 610 then send the log data via a network 620 (e.g., a local area network (LAN), a mobile communications network, a satellite communications network, the Internet, any combination thereof, etc.) to a server 630. In some embodiments, server 630 may run a conductor application and the data may be sent periodically as part of the heartbeat message. In certain embodiments, the log data may be sent to server 630 once a predetermined amount of log data has been collected, after a predetermined time period has elapsed, or both. Server 630 stores the received log data from listeners 610 in a database 640.

When instructed by a human user (e.g., an RPA engineer or a data scientist), when a predetermined amount of log data has been collected, when a predetermined amount of time has passed since the last analysis, etc., server 630 accesses log data collected from various users by listeners 610 from database 640 and runs the log data through multiple AI layers 632. AI layers 632 process the log data and train a local ML model based on the user's interactions with the robot. Server 630 may then automatically generate a workflow calling the trained local ML model, generate a robot implementing the workflow (or a replacement robot), and push the generated robot out to user computing systems 602, 604, 606 to be executed thereon.

Alternatively, in certain embodiments, suggested processes from AI layers 632 may be presented to an RPA engineer via a designer application 652 on a computing system 650. The RPA engineer can then review the workflow, make any desired changes, and then deploy the workflow via a robot to computing systems 602, 604, 606, or cause the robot to be deployed. For example, deployment may occur via a conductor application running on server 630 or another server, which may push a robot implementing the process out to user computing systems 602, 604, 606. In some embodiments, this workflow deployment may be realized via automation manager functionality in the designer application, and the RPA engineer may merely click a button to implement the process in a robot.

Listeners

In order to extract data pertaining to actions taken by users on computing systems 602, 604, 606 when interacting with the robots, listeners 610 may be employed on the client side at the driver level (e.g., drivers 340 of FIG. 3) to extract data from whitelisted applications. For example, listeners 610 may record where a user clicked on the screen and in what application, keystrokes, which button was clicked, instances of the user switching between applications, focus changes, that an email was sent and what the email pertains to, etc. Additionally or alternatively, listeners 610 may collect data pertaining to robots operating on computing systems 602, 604, 606. In some embodiments, the robots that perform various tasks implementing workflows may function as listeners for their own operations. Such data can be used to generate high-fidelity logs of the user's interactions with computing systems 602, 604, 606 and/or the operation(s) of robots running thereon.

In addition to or alternatively to generating log data for process extraction, some embodiments may provide insights into what users are actually doing. For instance, listeners 610 may determine which applications the users are actually using, what percentage of the time users are using a given application, which features within the application the users are using and which they are not, etc. This information may be provided to a manager to make informed decisions regarding whether to renew a license for an application, whether to not renew a license for a feature or downgrade to a less expensive version that lacks the feature, whether a user is not using applications that tend to make other employees more productive so the user can be trained appropriately, whether a user spends a large amount of time performing non-work activities (e.g., checking personal email or surfing the web) or away from his or her desk (e.g., not interacting with the computing system), etc.

In some embodiments, detection updates can be pushed to the listeners to improve their driver-level user interaction and/or robot operation detection and capture processes. In certain embodiments, listeners 610 may employ AI in their detection. In certain embodiments, robots implementing processes from automation workflows may automatically be pushed to computing systems 602, 604, 606 via respective listeners 610.

Figure 7:
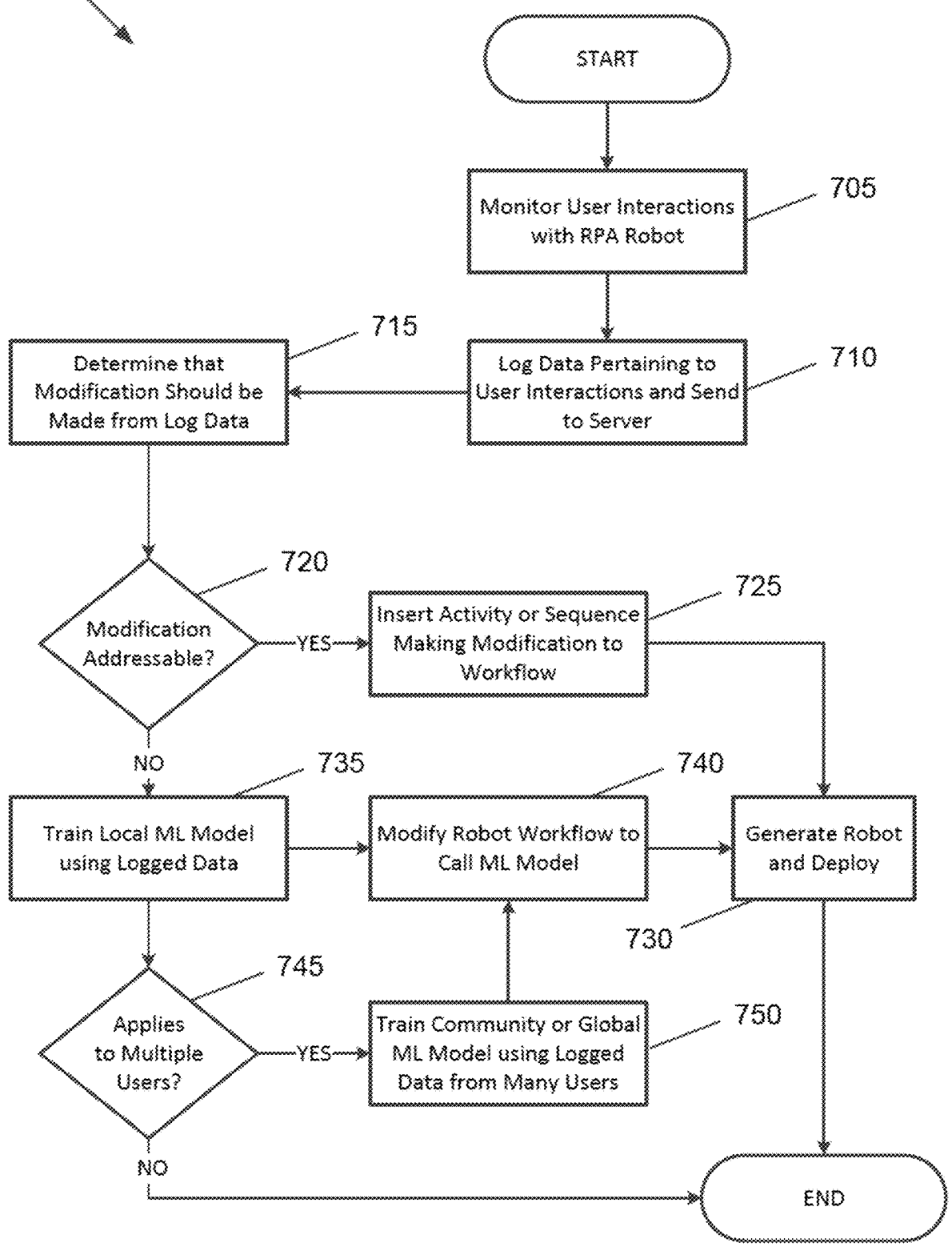
FIG. 7 is a flowchart illustrating a process for human-in-the-loop robot training for RPA, according to an embodiment of the present invention.

FIG. 7 is a flowchart illustrating a process 700 for performing human-in-the-loop robot training using AI for RPA, according to an embodiment of the present invention. The process begins with monitoring interactions of a user of a computing system with an RPA robot by a listener at 705. The listener may be a separate listener robot, the RPA robot that the user is interacting with itself, another listener software application, etc. Data pertaining to the user interactions is logged over time (e.g., stored in a log file) and sent to a server at 710.

The logged data may include exceptions noted by users, such as when a robot cannot find a license plate in an image, the robot may ask the user to indicate where the license plate is located in the image. This could be provided by the user via a bounding box, text, coordinates, positions on the screen, etc. Exceptions may also be user corrections made without the RPA robot requesting the corrections. These corrections may be due to errors and/or user preferences.

The server then determines that a modification should be made at 715 based on the exceptions noted by the user. This may be determined based on a predetermined number of exceptions of the same type being received by one or more users, due to the passage of a predetermined amount of time (e.g., a day, a week, a month, etc.), based on an exception frequency, any combination thereof (e.g., run weekly unless 50 exceptions of the same type are received in a shorter time period and are provided with at least a 75% frequency for the same task), etc. For instance, the server may make this determination by analyzing the logged data and noticing that the user often makes a certain change above a predetermined threshold (e.g., at least 50% of the time).

The server first determines whether the modification is addressable for that user via a certain activity or a series of activities at 720. For example, the server may be able to perform the correction by including an activity that looks up a certain value (e.g., looks up and adds a certain number to a field in an invoice) or including a sequence of activities (e.g., look up template email body text from a database and insert certain text into the email, that he user appears to prefer). In other words, the modification may be made in this case by mimicking the user's actions in the exception. If this is the case, the activity or sequence of activities making the modification are inserted into the workflow at 725. In some embodiments, this may involve replacing one or more existing activities and/or modifying the logic of the workflow itself. A robot implementing the workflow is then generated and deployed to the user's computing system at 730.

In certain embodiments, the user's own computing system may perform steps 715, 720, 725, and 730. For instance, if the user is making a certain change for personalization, this may not require the computing power of a server to analyze and modify the robot. The user's computing system itself may thus determine whether a modification should be made, modify the workflow, generate the new version of the local robot, and deploy the new version of the robot in place of the previous one.

In some cases, however, the modification is too complex to be made by adding/modifying workflow activities alone. For example, an ML model for recognizing speech may need to be initially trained or an existing ML model may need to be retrained to recognize a user's accent. In this case, the server trains the ML model based on the logged data using machine learning techniques (e.g., a deep learning neural network) to create a local ML model (or a new version thereof) at 735. The workflow is modified to call this local ML model at 740, and a robot implementing this workflow is then generated and deployed at 730.

In some embodiments, the process of FIG. 7 may be implemented for many users across an organization and/or globally. As logged data is collected from multiple, many, or all users, certain patterns may emerge. For instance, analysis may reveal that a group of users in a certain location have similar accents and are noting similar exceptions, that a substantial number of all users are correcting a certain field in an invoice, that a substantial number of all users have a certain preference, etc. In some embodiments, this may be determined by a predetermined threshold (e.g., a predetermined number or percentage of users having the exception, a predetermined frequency of the exception, a number of times that the exception occurred over a time period, etc.) If this is the case at 745, a "community" ML model for a group of users or a company, or a global ML model for all users may be trained using this logged data at 750. The appropriate workflow is then modified at 740 and robot(s) that implement this workflow are generated and deployed at 730.

The frequency of the retraining may be based on the amount of logged data that is received. Larger groups of users may generate sufficient data to retrain the ML model more often (e.g., daily). However, smaller groups of users may take more time to generate enough logged data to be useful for retraining purposes.

The process steps performed in FIG. 7 may be performed by a computer program, encoding instructions for the processor(s) to perform at least part of the process(es) described in FIG. 7, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIG. 7, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A cloud robotic process automation (RPA) system, comprising:
   a user computing system comprising an RPA robot and a listener; and
   one or more cloud computing systems configured to perform human-in-the-loop RPA robot training using artificial intelligence (AI), wherein
   the listener is configured to:
      monitor user interactions with the RPA robot via the user computing system and log data pertaining to the interactions, and
      transmit the logged data pertaining to the user interactions to the one or more cloud computing systems, and
   the one or more cloud computing systems are configured to:
      receive the logged data pertaining to the user interactions,
      determine whether a modification should be made to an RPA workflow for the RPA robot based on a predetermined number of exceptions of a same type being received by one or more users in the logged data, based on an exception frequency, or both, and
      when the one or more cloud computing systems determine that the modification should be made and the modification is addressable by inserting an activity or sequence of activities into the RPA workflow for the RPA robot, insert the activity or sequence of activities into the RPA workflow for the RPA robot that makes the determined modification.

2. The cloud RPA system of claim 1, wherein the one or more cloud computing systems are further configured to:
   generate a new version of the RPA robot using the modified RPA workflow; and
   deploy the new version of the RPA robot to the user computing system.

3. The cloud RPA system of claim 1, wherein the user computing system is configured to:
   receive a new version of the RPA robot from the one or more cloud computing systems; and
   deploy the new version of the RPA robot.

4. The cloud RPA system of claim 1, wherein the logged data comprises exceptions noted by the user via the user computing system during operation of the RPA robot.

5. The cloud RPA system of claim 4, wherein the exceptions pertain to errors by the RPA robot, user preferences, or both.

6. The cloud RPA system of claim 1, wherein when the modification is not addressable by inserting the activity or sequence of activities into the RPA workflow, the one or more cloud computing systems are further configured to:
   train a local machine learning (ML) model based on the logged data; and
   modify the RPA workflow to call the trained ML model.

7. The cloud RPA system of claim 1, wherein the one or more cloud computing systems are further configured to:
   collect logged data pertaining to interactions of other users of other computing systems with respective RPA robots,
   when exceptions for the user are similar to those in the collected logged data for a group of the other users that is a subset of all of the other users:
      train a community ML model for the subset of users, and
      modify the RPA workflow to call the community model, and
   when exceptions for the user are similar to those in the collected logged data for a group of the other users and exceeds a global retraining threshold:
      train a global ML model for all users, and
      modify the RPA workflow to call the global model.

8. The cloud RPA system of claim 1, wherein the logged data is transmitted to the one or more cloud computing systems by the listener as part of a heartbeat message to a conductor application running on one or more cloud computing systems.

9. A non-transitory computer-readable medium storing a computer program, the computer program configured to cause at least one processor to:
   monitor user interactions with an RPA robot via a user computing system and log data pertaining to the interactions, the logged data comprising exceptions;
   transmit the logged data pertaining to the user interactions to one or more cloud computing systems of a cloud RPA system;
   receive a new version of the RPA robot from the one or more cloud computing systems of the cloud RPA system that has been modified to address the exceptions in the logged data responsive to receiving a predetermined number of exceptions of a same type, an exception frequency, or both; and
   deploy the new version of the RPA robot.

10. The non-transitory computer-readable medium of claim 9, wherein the exceptions pertain to errors by the RPA robot, user preferences, or both.

11. The non-transitory computer-readable medium of claim 9, wherein the logged data is transmitted to the one or more cloud computing systems of the cloud RPA system as part of a heartbeat message to a conductor application running on the one or more cloud computing systems.

12. The non-transitory computer-readable medium of claim 9, wherein the logged data is sent to the one or more cloud computing systems of the cloud RPA system after a predetermined amount of data has been collected, after a predetermined time period has elapsed, or both.

13. A computer-implemented method for performing human-in-the-loop robotic process automation (RPA) robot training using artificial intelligence (AI), comprising:
   receiving, by one or more cloud computing systems of a cloud RPA system, logged data pertaining to interactions of a user with an RPA robot;
   determining, by the one or more cloud computing systems, whether a modification should be made to an RPA workflow for the RPA robot based on a predetermined number of exceptions of a same type being received by one or more users in the logged data, based on an exception frequency, or both; and
   when the one or more cloud computing systems determine that the modification should be made and the modification is addressable by inserting an activity or sequence of activities into the RPA workflow for the RPA robot, inserting the activity or sequence of activities into the RPA workflow for the RPA robot that makes the determined modification, by the one or more cloud computing systems.

14. The computer-implemented method of claim 13, further comprising:
   generating a new version of the RPA robot, by the one or more cloud computing systems, using the modified RPA workflow; and
   deploying the new version of the RPA robot, by the one or more cloud computing systems.

15. The computer-implemented method of claim 13, wherein the logged data comprises exceptions noted by the user during operation of the RPA robot.

16. The computer-implemented method of claim 15, wherein the exceptions pertain to errors by the RPA robot, user preferences, or both.

17. The computer-implemented method of claim 13, wherein when the modification is not addressable by inserting the activity or sequence of activities into the RPA workflow, the method further comprises:
   training a local machine learning (ML) model based on the logged data, by the one or more cloud computing systems; and
   modifying the RPA workflow to call the trained ML model, by the one or more cloud computing systems.

18. The computer-implemented method of claim 13, further comprising:
   collecting logged data pertaining to interactions of other users with respective RPA robots, by the one or more cloud computing systems;
   when exceptions for the user are similar to those in the collected logged data for a group of the other users that is a subset of all of the other users:
      training a community ML model for the subset of users, by the one or more cloud computing systems, and
      modifying the RPA workflow to call the community model, by the one or more cloud computing systems; and
   when exceptions for the user are similar to those in the collected logged data for a group of the other users and exceeds a global retraining threshold:
      training a global ML model for all users, by the one or more cloud computing systems, and
      modifying the RPA workflow to call the global model, by the one or more cloud computing systems.

* * * * *